(12) United States Patent
Cohen et al.

(10) Patent No.: US 8,660,942 B2
(45) Date of Patent: Feb. 25, 2014

(54) LOAN MANAGEMENT SYSTEM AND METHODS

(75) Inventors: Devon Cohen, Wellington, FL (US);
Barbara Dolan, Boca Raton, FL (US);
Eugene Pratasenia, Naples, FL (US);
Mikalai Varnitski, Fort Myers, FL (US);
Peter J. Buggeln, Boca Raton, FL (US);
Leslie Kevin Suttles, Coral Springs, FL (US); Christopher Wheaton, Boynton Beach, FL (US)

(73) Assignee: Advance Loan Technologies LLC, Plantation, FL (US)

( * ) Notice: Subject to any disclaimer, the term of this patent is extended or adjusted under 35 U.S.C. 154(b) by 0 days.

(21) Appl. No.: 13/342,806

(22) Filed: Jan. 3, 2012
(Under 37 CFR 1.47)

(65) Prior Publication Data
US 2012/0317015 A1    Dec. 13, 2012

Related U.S. Application Data

(60) Provisional application No. 61/429,048, filed on Dec. 31, 2010.

(51) Int. Cl.
*G06Q 40/00* (2012.01)
(52) U.S. Cl.
USPC .............................................. 705/38; 705/35

(58) Field of Classification Search
USPC ............................................................ 705/38
See application file for complete search history.

(56) References Cited

U.S. PATENT DOCUMENTS

| | | | | |
|---|---|---|---|---|
| 5,870,721 | A * | 2/1999 | Norris | 705/38 |
| 5,940,812 | A * | 8/1999 | Tengel et al. | 705/38 |
| 7,693,782 | B1 * | 4/2010 | Stricker et al. | 705/38 |
| 2001/0029482 | A1 * | 10/2001 | Tealdi et al. | 705/38 |
| 2005/0289045 | A1 * | 12/2005 | Lawson | 705/38 |
| 2008/0010152 | A1 * | 1/2008 | Sennott et al. | 705/14 |

* cited by examiner

*Primary Examiner* — Rajesh Khattar
(74) *Attorney, Agent, or Firm* — Johnson & Martin, P.A.; James David Johnson

(57) ABSTRACT

A system for managing loans and loan leads is described. The loan and loan lead management system features software and hardware that permit loan applications to be received, submitted, and processed in an automated electronic process while also generating leads based on loan applicants whose loan applications are rejected or withdrawn that may be sold to other lenders. Another module of the system's software permits loan applicant information to be cross-checked against databases containing details concerning defaulted borrowers to enhance the ability of lenders to engage in collection efforts against debtors. The system may also be installed at a retail location to provider store-level loan application submission and processing that can generate resalable leads that can be transmitted by a system administrator to lead purchasers.

20 Claims, 2 Drawing Sheets

LOAN MANAGEMENT SYSTEM AND METHODS

CROSS-REFERENCE TO RELATED APPLICATION

This application is a nonprovisional application of and claims priority from U.S. provisional patent application Ser. No. 61/429,048 filed Dec. 31, 2010. The foregoing application is incorporated in its entirety herein by this reference.

FIELD OF THE INVENTION

The invention relates to loan management. More particularly, the invention relates to systems, methods, and software for managing loans and loan leads.

BACKGROUND

Lenders have used software and computer systems to submit loan applications made by potential borrowers. Conventional loan software is used primarily for inputting and transmitting borrower (i.e., loan applicant) and loan application information to a central processing center where the loan application can be reviewed by an underwriter for acceptance or rejection and, if accepted, approved for processing. Conventional loan management software systems do not allow lenders and other loan application processors to automatically generate resalable leads from loan applications that are denied or withdrawn. Conventional loan management programs also do not cross-reference loan applicant or lead information related to applicants who are denied a loan or who withdraw a loan application or leads that are denied with lists of defaulted debtors to locate matches thereby improving collection efforts by lenders.

SUMMARY

The invention relates to a system for managing loans and loan leads. The loan and loan lead management system features software and hardware that permit loan applications to be received, submitted, processed, and analyzed in an automated electronic process while also generating leads based on loan applicants whose loan applications are rejected or withdrawn that may be sold to other lenders. Another module of the system's software permits loan applicant information to be cross-checked against databases containing details concerning defaulted borrowers to enhance the ability of lenders to engage in collection efforts against debtors. The system may also be installed at a retail location to provider store-level loan application submission and processing that can generate resalable leads that can be transmitted by a system administrator to lead purchasers.

The software can be installed on a server and accessed remotely via a plurality of computers communicatively linked to the server by a telecommunications network.

Accordingly, the invention features a loan management system that can include a server having at least one database stored thereon, a computer that is located remotely from the server, a telecommunications network that communicatively connects the server and the computer, and loan management software installed on at least one of the server and the computer. The loan management software can include one or more loan management and lead generation modules such as, for example:

(i) an automated loan and lead management platform for accepting a new loan application and automatically determining whether to accept the new loan application or to deny the new loan application and to resell the denied new loan application as a lead;

(ii) an automated store-level lead platform for accepting a new loan application on a computer located at a retail location, automatically determining whether to accept or to reject the new loan application at the retail location using the loan management software installed on the computer, and automatically and electronically transmitting the denied new loan application to a client as a lead generated by the store-level lead platform;

(iii) an automated underwriting module installed on the server that can include a plurality of underwriting rules used in automatically and electronically determining new loan application approval. A system administrator can select one or more of the plurality of underwriting rules to implement based on effectiveness and cost criteria;

(iv) an automated collections tracking module installed on the server. The collections tracking module transmits a lead to a lender client that includes information related to a loan applicant whose new loan application is denied. The lead is compared electronically against a plurality of collection records stored in the at least one database stored on the server to determine whether the loan applicant matches one of the plurality of collection records containing information related to a defaulted borrower. The collections tracking module automatically and electronically notifies the lender client when a loan applicant-defaulted borrower match is located; and (v) an automated lead generation module installed on the server and accessible to a loan applicant via the computer. The lead generation module is integrated with the loan application system, and includes lead generation features that are activated electronically if a first loan application submitted by the loan applicant is denied by the loan management system or withdrawn by the loan applicant so that the loan applicant is electronically directed by the loan management system to the lead generation module. The lead generation module features a website through which the loan applicant can input user information to automatically and electronically submit a second loan application. The transmission of the second loan application to the server generates a lead for resale to other lenders.

The invention also features a loan management system having a server featuring at least one database stored thereon, a computer that is located remotely from the server, a telecommunications network that communicatively connects the server and the computer, and loan management software. The loan management software can include a client component installed on the computer and an administrator component installed on the server, and can further include machine-readable instructions and data for causing the computer to set up bi-directional communications with the server. The bi-directional communications are established by requests initiated by the computer and can feature new loan application submission, new loan application approval processing, collections tracking, and lead generation comprising leads created from denied and withdrawn loan applications.

In another aspect, the invention can feature the system further including an intelligent lead routing module that (i) analyzes demographic and financial attributes of a customer and determines the types of loan products and underwriting channels that are needed for the customer and (ii) predicts potential profitability of the lead so that a lead recipient knows how much can be paid for the lead while still making a profit.

In another aspect, the invention can feature the system further including a marketing module for creating a marketing campaign based on a customer's attributes.

In another aspect, the invention can feature the marketing campaign being triggered based on an event that occurs.

In another aspect, the invention can feature the marketing campaign being triggered based on an event that does not occur.

In another aspect, the invention can feature the computer being located in a home of office of a customer.

In another aspect, the invention can feature the computer being located in a retail location.

In another aspect, the invention can feature the system receiving a new loan application submission and either accepting or rejecting the loan application based upon customer attributes.

In another aspect, the invention can feature the system generating a lead created from a rejected loan application and selling the lead to a lead recipient.

In another aspect, the invention can feature the system including a bounce-bounce process software module that automatically sends a finance fee due on a loan to collections if a first loan payment is not made and converts the original principal of the loan into a new loan.

In another aspect, the invention can feature the finance fee due on the loan in connection with a second loan payment as well as the new loan created after the first failed payment being both sent to collections if the second loan payment is not paid, which is due consecutively after the first loan payment.

In another aspect, the invention can feature the system automatically suspending borrowing privileges of a customer who fails to make two consecutive loan payments.

In another aspect, the invention can feature the system automatically voiding a customer's e-signature on a loan application if a loan approved a result of the loan application is not set for funding by an established effective date, and further features the system generating and sending the customer an e-mail request to resign the loan application to establish a new effective date.

In another aspect, the invention can feature the system including an automated loan portfolio analysis feature for analyzing customer attributes and profitability on a dynamic real-time basis.

In another aspect, the invention can feature the automated loan portfolio analysis feature permitting a user to dynamically analyze and compare the business impact of a plurality of underwriting processes on one or more customers or customer segments with respect to at least one business criteria.

In another aspect, the invention can feature the at least one business criteria including at least one of the following: origination volume, delinquency, first payment default, renewal rates, and profitability.

In another aspect, the invention can feature the system's automated loan portfolio analysis feature sorting data by one or more lead attributes.

In another aspect, the invention can feature the one or more lead attributes including at least one of the following: a source of a lead, a store in which the lead was processed, a type of loan, one or more customer attributes, a date range, and a time range.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

Figure 1A:
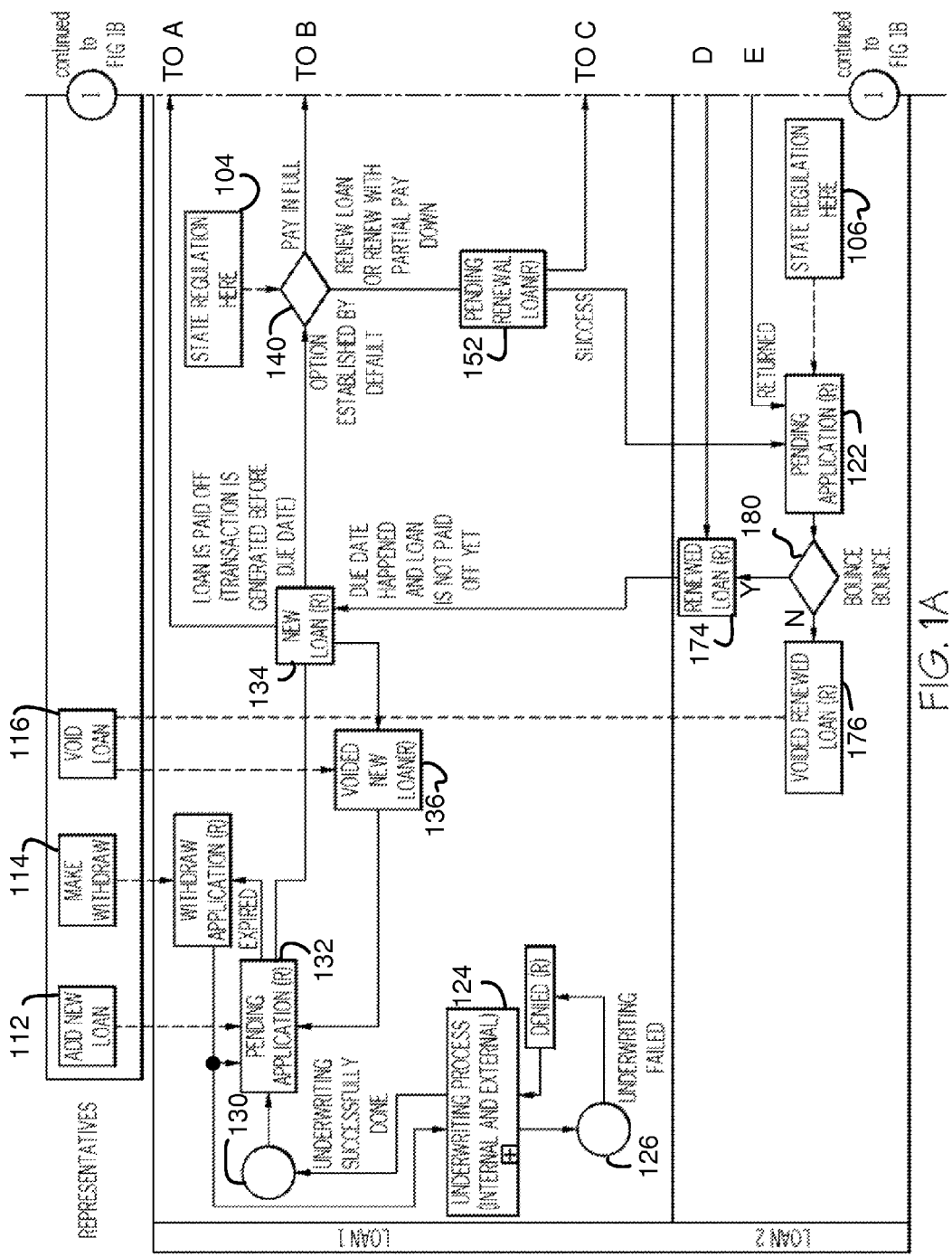
FIG. 1 is a schematic diagram of a loan and loan lead management system.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention is not limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The present invention will now be described in detail with reference to embodiments thereof as illustrated in the accompanying drawings.

Figure 1B:
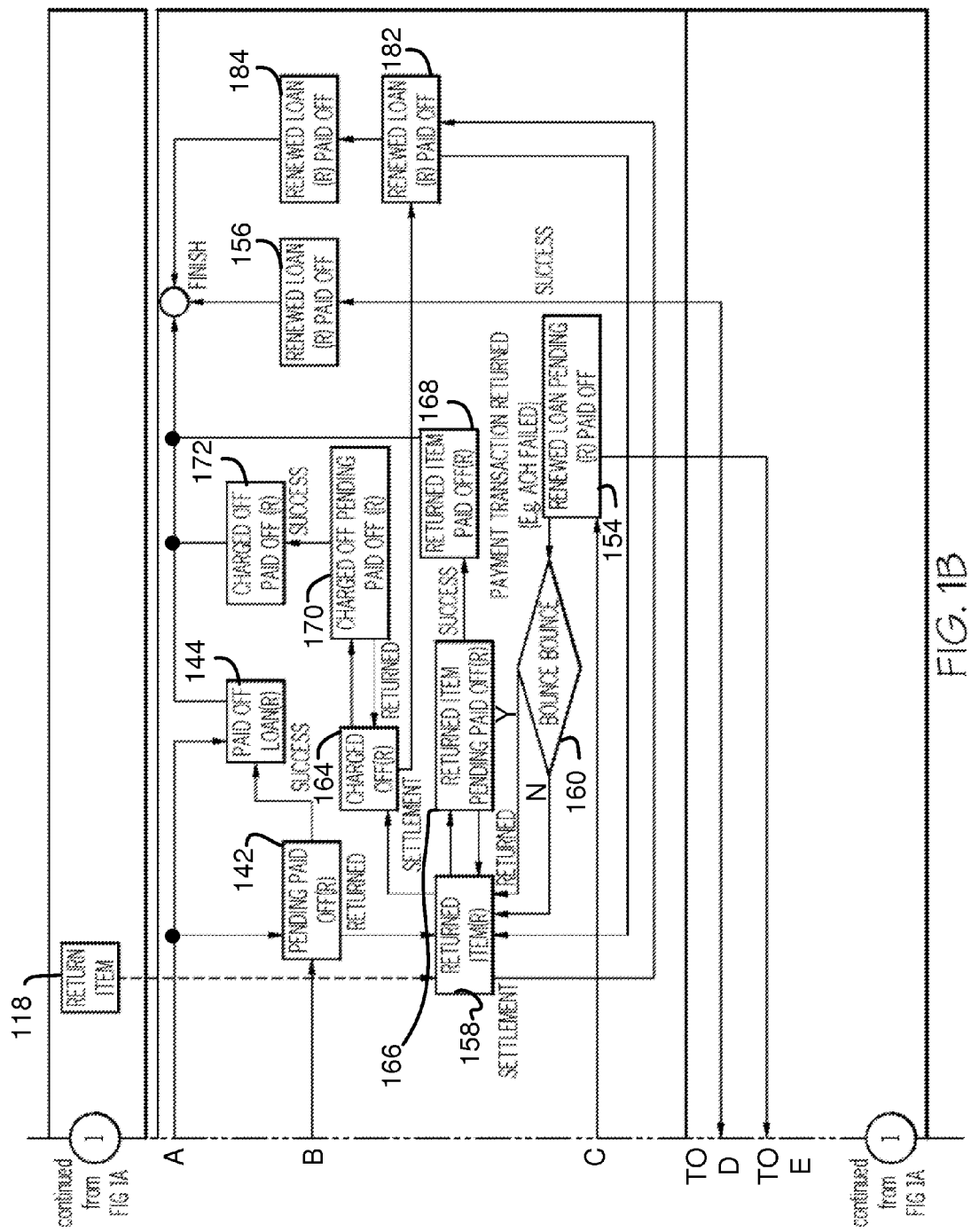

The invention provides systems and methods for managing loans and loan leads. FIG. 1 provides a schematic diagram of one embodiment of a loan management system of the invention. In an exemplary embodiment to be described herein, the invention includes a system that includes at least one software program installed on a server that is communicatively connected to a telecommunications network such as, for example, the Internet. In other embodiments, the server could be connected to a local area network (LAN), wide area network (WAN), virtual private network (VPN), or other network through which electronic communications may be sent and received.

It is to be understood that the system may include a plurality of servers, a plurality of databases stored on each server, and more than one telecommunications network as needed by the lender or system administrator. Each server of the system can be an application server and database server, or in another embodiment, one or more servers can be application servers while one or more different servers can be database servers. Software of the system, including the modules described herein, can be installed on the application server to allow remote access to the system software, while the database server can store information, or data, that is retrievable by the application server to be analyzed or otherwise used by the software installed on the application server in the performance of its intended functions.

In an exemplary embodiment, the system's software is not installed on a client's server but is accessed by clients from anywhere as "software as a service" or SAS. The software can be accessed from any remote location that has a computer and an Internet connection. In other embodiments, parts or all of the system software may be installed on a client's server. The client can be a lender.

The software can be accessible by a plurality of computers, which can be located remotely in a location that is different from the location of the server. For example, the software can be accessed at one of the plurality of computers via a website that is hosted on the server and is accessible via the Internet. The plurality of computers can be installed anywhere that has a connection to the Internet or other telecommunications network over which the system is intended to operate. In one embodiment of the system, the system could be accessible via computers installed in brick-and-mortar locations such as, for example, banks, credit unions, savings and loans, check cashing stores, payday loan stores, other money lending business locations, retail locations, kiosks, or any other suitable location having a power source and a connection to the telecommunications network. In another embodiment, the system can be accessible via a computer with an Internet connection at a loan applicant's home or workplace or any other location having a computer, a connection to the telecommunications network, and a power source. The loan applicant may also be referred to herein as a potential borrower. The system can be maintained by a lender or other system administrator for purposes of lending, assisting in collection efforts, and for generating leads that that may be resold to other lenders.

The software can include integrated modules for managing a loan from start to finish (i.e., from application submission and processing to loan repayment). The system is automated and decides loan approval, issues loans, and collects loan payments, all without human involvement other than in the data entry of loan application information inputted by a loan applicant, loan officer, or other person acting on the loan applicant's behalf. To submit a new loan application, the system requires the loan applicant (or someone acting on the loan applicant's behalf, e.g., a loan officer or lender representative) to enter the loan applicant's personal information (e.g., name, current address, previous address, telephone number, e-mail address, date of birth, and/or Social Security Number) as well as the loan amount requested into the loan management software's loan application platform. This data forms the loan application, which is transmitted electronically by the system to the server where an underwriting module of the software reviews and either approves or denies the loan application. In an alternate embodiment, the loan application may be electronically submitted to a human underwriter for review and either approval or rejection. If the loan application is approved by the underwriting module of the software, the system contacts the loan applicant and provides the loan applicant with the options to accept or to reject the loan. If the loan applicant accepts the loan, a new loan is created in the system's loan database and the lender can disburse loan funds to the loan applicant. Upon receiving funds from the lender, the system reclassifies the loan applicant as a debtor (also referred to herein as a borrower) and adds the debtor to a debtor database stored on the server.

The system can include four levels of underwriting and decisioning of leads. The software of the system can determine electronically and nearly instantaneously the best underwriting criteria by tracking and comparing different combinations of underwriting rules based on effectiveness and cost criteria. In another embodiment, the underwriting criteria can be selected by a human operator or system administrator.

If the loan applicant's loan application is rejected, denied, or withdrawn, the system can generate a lead using the loan applicant's personal information and requested loan amount. In one embodiment, the loan application electronic file may itself be converted into a lead. The lead may be resold by electronic means to other lenders who may be interested in making a loan to the loan applicant based on those lender's own lending criteria. The lead can be immediately resold or can be held and sold in batches with other leads generated from denied loan applications.

The system also provides intelligent lead routing by automatically analyzing the attributes of customers and determining what types of products and underwriting channels are needed based on lead attributes of each customer. The lead attributes can include demographic information pertaining to each individual customer (e.g., age, income level, or any other demographic factor) and financial information pertaining to each individual customer (e.g., income, socioeconomic status, or any other financial factor). The system's ability to intelligently route leads provides predictions of the potential profitability of a lead so that a lead recipient ca know or estimate how much can be paid for the lead while still making a profit. Thus, the system's intelligent lead routing allows lead recipients (i.e., other potential lenders) to predict the lifetime value of customer associated with the lead.

The system also automates loan portfolio analysis by analyzing customer attributes and profitability on a dynamic real-time basis. The system's automated loan portfolio analysis allows a user (e.g., a lender) to dynamically analyze and compare the real-time impact of multiple underwriting processes on one or more customers or customer segments (i.e., groups of customers selected randomly or selected based on criteria chosen by the user) with respect to origination volume, delinquency, first payment default, renewal rates, and profitability. The system can sort the data by up to three layers of attributes including, but not limited to, the source of a lead, the store in which the lead was processed, type of loan, customer attributes such as age and income, and date and time ranges. Leads can be viewed at different price points.

One feature of the system includes the ability to intake loan applications and to make decisions either to approve a loan request and make a loan or to reject the loan request and to generate a lead based on the rejected loan request that can be resold through a marketing platform.

For existing customers, the system may provide an express loan dialog feature, which permits the lender to issue an express loan for a customer whose data already exists in the system. This express loan feature permits the lender to avoid unnecessary external underwriting costs as well to provide accelerated and simplified loan origination processing for existing customers.

The software of the system can also include a module that provides a loan application that can be completed by a potential borrower at a retail location using a computer that is communicatively connected to the telecommunications network. In an exemplary embodiment, the retail location can be a check cashing store. In other alternate embodiments, the retail location can be a bank, credit union, savings and loan, retail store, or any other place of business that is suitable for installing and maintaining a computer with a connection to the server via the telecommunications network. In another embodiment, the software installed on the server can be made available to potential borrowers via a website accessible through a browser software program installed on a computer connected to the telecommunications network. In this module, when a loan application is denied at a store level, i.e., at the retail location, a lead is automatically generated and transmitted to a client for a resale opportunity. The client may choose whether to pursue the lead by contacting the potential borrower and offering another loan to the potential borrower.

Payments can be received and processed automatically by the system using automated ACH transfers where the ACH transactions are coordinated and scheduled by the lender and customer. Returns can also be automated through the system using ACH transfers. In other embodiments, loan payments may be accepted from customers in other forms, e.g., via debit card, credit card, cash, check, wire transfer, or any other suitable form of payment.

The system uses various work processing queues (e.g., an ACH Queue) to enable efficient processing and analysis of bankruptcies, consumer credit accounts, garnishments, outside collections, denied loan applications, withdrawn loan applications, and duplicate leads.

The software of the system can also include an automated debt collection assistance (or collections tracking) module that electronically compares the personal information of a loan applicant (stored in the loan applicant database) whose loan application is rejected with personal information related to a list of defaulted debtors maintained in a defaulted debtor database stored on the server. In another embodiment, when a lead is rejected by the system (e.g., because the loan applicant associated with the lead is not creditworthy), the debt collection assistance module can electronically compare personal information associated with the denied lead with personal information related to a list of defaulted debtors maintained in a defaulted debtor database stored on the server. When the system detects a match between the personal information of the loan application or lead and the personal information of a defaulted debtor, a positive match notification is generated that permits the lender, or other lenders with whom the lender shares access to information, to renew collection efforts against the defaulted debtor using the personal information supplied by the defaulted debtor in the loan application submitted through the system or contained in the denied lead. In this way, the debt collection assistance module assists lenders in their collection efforts against defaulted debtors by serving as a skip-trace that locates defaulted debtors who were previously unable to be located by the lender or the lender's collection agent. The system can store updated personal information for loan applicants in a collections update queue, which may or may not be automatically processed by the system. In one embodiment, a collector (i.e., the lender who holds the defaulted loan) or processor can then determine whether to use the stored updated personal information for collection purposes.

The software of the system can further include an automated lead generation module installed on the server and accessible to a loan applicant via the computer. The lead generation module is integrated with the loan application system and can include lead generation features. The lead generation features can be activated electronically if a first loan application submitted by the loan applicant is denied by the loan management system or withdrawn by the loan applicant so that the loan applicant is electronically directed by the loan management system to the lead generation module. The lead generation module features a website through which the loan applicant can input user information to automatically and electronically submit a second loan application. The website can be hosted on the server and accessible by the loan applicant using any computer that has a connection to the telecommunications network so as to enable communication with the server. The transmission of the second loan application to the server generates a lead for resale to other lenders. The lead may be electronically transmitted and sold to other lenders based upon lending criteria used by those lenders.

Although the system can be used to process, manage and generate leads from any type of loan or loan application such as, for example, mortgage loans, auto loans, student loans, personal loans, and business loans, in an exemplary embodiment, the system is used to process, manage and generate leads from payday loans and payday loan applications. Payday loans include short-term loans intended to cover the borrower's expenses until the borrower's next paycheck is received. The system can process, manage and generate leads from installment loans, lines of credit, title loans, and other types of consumer loans. The capability of processing, managing, and generating leads from each type of loan may be provided through software modules that can be added on to the system by clients who wish to obtain or purchase such modules for their own business needs.

In another embodiment, the system can include an automated duplicate lead processing module that can recognize loan applications by the same applicant, which result in the generation of a duplicate lead for that applicant in the system. When a lead related to a specific applicant has already been received through the filing of a loan application or when a loan application submitted by a specific loan applicant has already been processed, if the loan applicant files a second loan application or a duplicative lead related to the same applicant is otherwise received by the system, the system can use business rules and logic to process the loan differently based on what happened with the original lead or loan application. For example, the duplicate lead generated as a result of the second loan application filed by the applicant can be processed differently based on whether the first loan application was approved or rejected, whether the applicant accepted the first loan, the repayment history associated with the applicant and the first loan, or any other factors or criteria programmed into the system for tracking and analysis.

In another embodiment, the system can include an automated portfolio analysis module. The portfolio analysis module can analyze and compare loan attributes of a plurality of loans over a user-specified or a predetermined period of time to statistically determine which loan attributes are associated with a higher rate of delinquency.

The system can also include an automated data aggregation module that performs data aggregation by importing data from external underwriters. Over a period of time, the system can use the data aggregation module and the imported data to develop its own decision-making models. The system can use the data aggregation module to aggregate data associated with every lead that uses data from an external source. The system uses the aggregated data to build its own data models to permit its own automated decision-making with respect to underwriting and loan approval.

In still another embodiment, the system can feature an automated marketing module. The marketing module can create one or more marketing campaigns that are triggered by events that occur or by events that fail to occur. The marketing campaigns can also be created based on customer attributes, for example, demographic or financial factors and data pertaining to those factors associated with each individual customer. Templates can be created online using the system and its software. The marketing module can deliver communications by electronic (e.g., e-mail), interactive voice response (IVR) via a telephone system, or other means to a consumer (i.e., a loan applicant) as a result of the trigger of one of the marketing campaigns that are part of the software of the marketing module. In an exemplary embodiment, the marketing campaigns can be delivered via text message (e.g., SMS or MMS) to the cellular phone of a customer. For example, in one marketing campaign that can be automatically initiated by the marketing module, if an underwriter approves a loan application, the marketing module of the system triggers the delivery of an e-mail to the consumer to sign loan documents either electronically via accessing the system from a remotely located computer or by visiting the offices of the lender. In another example, a marketing campaign may be initiated to a customer who pays a loan successfully to obtain new business from the customer. In another example, if a loan applicant's loan application is rejected, the system can initiate a marketing campaign to send at least one e-mail to the loan applicant, wherein the e-mail can include a pre-filled application which the loan applicant can submit electronically via the telecommunications network. The pre-filled loan application can include personal information related to the loan applicant pre-filled in a form that is included in the e-mail's body, as a link in the e-mail that can be pointed to and opened as a web page in a web browser software program, or as an attachment to the e-mail (e.g., a PDF document). If the loan applicant chooses to electronically submit the pre-filled loan application, a lead is generated that can then be sold to other lenders who may be interested in lending to the loan applicant based on their own lending qualification criteria. The marketing module of the system may automatically send an e-mail containing a pre-filled loan application to a borrower who has a good payment history. The marketing campaign e-mail may be automatically sent by the system to the borrower after a pre-determined amount of time has elapsed after the borrower has repaid the first loan successfully. For example, the system can be programmed to automatically market to customers who have good payment histories by sending e-mails to them thirty days after repayment of each of their first loans and offering another loan through the pre-filled application containing each customer's personal information that is attached to each marketing campaign e-mail. In yet another example, marketing campaigns may be initiated and delivered to customers who fill out a loan application but who do not e-sign the application so that these customers are encouraged to complete the process and accept the loan.

The automated marketing module can feature integrated e-mail, short message service (SMS) text communication service, and interactive voice response (IVR) systems for delivering marketing campaign communications. The marketing campaign communications are designed to enhance loan funding, customer retention, renewal and collection efforts.

The system can include a balance history feature that monitors and tracks each loan in real time, daily, or in some other time interval. The balance history feature can be used to track events (e.g., payments received, late payments, etc.) on a daily basis.

The system can also include an outstanding receivables reconciliation report, which is an accounting report that automatically tracks beginning receivables, new receivables, reductions in receivables, and ending receivables, in summary and with loan detail, for loans in good standing, fees, defaulted loans, and charged-off loans.

The system may include security features that ensure that unauthorized users may not log into and access the system and its software. For example, as a security measure, the system may utilize IP address validation to check all users with administrator ("admin") or employee roles against existing compiled list of trusted IP addresses. If no match is found in the list for an IP address from which a computer is attempting to log in, access can be denied. A warning message alerting the user to the problem and advising the user to contact a manager for assistance may be provided if the user attempts to access the system from an unrecognized IP address. This feature increases the security of the system and allows remote access and connections to the system to be controlled to prevent unauthorized access and intrusions.

The system can track and store all incoming and outgoing electronic communications with customers to create an audit trail that can be reviewed in the future as required by the lender or system administrator.

If processing for a loan is not completed by the established effective date so that the loan can be funded, the system can automatically void the customer's e-signature and can send the customer an e-mail or other communication (e.g., text message) asking the customer to return to resign the loan application so that a new effective date can be established. This feature of the system allows lender and system administrators to maintain regulatory compliance with laws and government regulations such as, for example, the Truth In Lending Act.

The software of the system can incorporate one or more dashboards that highlight real-time operational results. Among other features that the system can include are advanced reporting and customized reporting, automatic refreshing of system data, and the ability to automatically revive the effective date of loans.

The invention also features methods that are useful for loan management and loan lead generation. In an exemplary embodiment, the methods can be implemented using one of the loan management systems described hereinabove. For example, the methods of the invention may include any of the following steps and processes described as follows.

A loan application can be entered into the system from one of the following sources: a lead provider, a website application form, or manual entry by a user. Once the application has successfully passed internal underwriting (e.g., based on the system provider or lender's rules management and information tables) and external (e.g., paid third-party) underwriting, a loan status of Pending Application or Pending Application R is assigned, and the customer with whom the loan application is associated will be placed in a pending application queue. The "R" in Pending Application R, as used herein, designates that the pending application is made by a returning customer.

Once a loan application for a customer is entered into the system, a new loan application may be added that is associated with the same customer as the original loan. Once the new loan application has successfully passed internal underwriting (e.g., based on the system provider or lender's rules management and information tables) and external (e.g., paid third-party) underwriting, a loan status of Pending Application or Pending Application R is assigned, and the customer with whom the loan application is associated will be placed in a pending application queue.

In the event that the customer's loan application does not pass internal or external underwriting, the loan application is assigned a status of denied and is moved to a denied queue. The denied status of any particular loan application that has been denied may include reason for the denial will be assigned and system should reflect denied reason. The customer's loan application is removed from the pending application queue and is placed into the denied queue.

If a new loan application is set up in error, the system includes a feature that permits loans with the status New Loan or New Loan R to be voided and their status changed to voided. The "R" in New Loan R, as used herein, designates that the pending application is made by a returning customer. Voided loans are removed from the pending application queue.

When a customer's application has passed underwriting (internal and external) and has signed (e.g., e-signed) the loan agreement, the system can be instructed to place the account into the loan approval queue. Once the ACH transaction is generated through batch processing, the system changes the loan application status from Pending Application to New Loan or New Loan R, and the loan is placed in the ACH queue. The system can generate reports in the future that detail this historical data related to each loan. The system can automatically check customer checklists to ensure that all information has been provided by the customer and all processes have been completed by the loan processor before the customer account is placed in the ACH queue for payment.

If the customer remains in "pending" status with respect to the loan application for more than a predetermined number of days or other time period without approval, the system can automatically change the status from Pending Application to Withdrawn Application or Withdrawn Application R and the customer can be transferred to a withdrawn applications queue.

If a user of the system manually changes the status of a customer's loan application to withdrawn, the system will assign the status as Withdrawn Application or Withdrawn Application R, and the customer will be moved to the withdrawn applications queue. The "R" in Withdrawn Application R, as used herein, designates that the withdrawn application was made by a returning customer. Withdrawn loans are removed from the pending application queue.

If the customer's application was for a New Loan or New Loan R, voiding the application either automatically or manually changes the status from Pending Application or Pending Application R to Voided New Loan or Voided New Loan R and removes the loan application from the pending application queue. The pending ACH transfer is also voided if it has not already been generated.

The system allows customers to pay their loans in several different ways. For example, the loan can be renewed, paid in full, or renewed with a partial down payment. Depending on the due date of the loan repayments, a due date module of the system can initiate an ACH transfer of funds from the customer (i.e., the borrower) to the lender or another party authorized to receive loan repayments on behalf of the lender.

When the customer successfully pays off a loan with an ACH or non-ACH transaction before the due date, the loan is assigned a status of Pending Paid Off (R) to complete the financial transaction. If the loan is paid off with a credit card, debit card, cash, or other guaranteed funds, the loan is marked with a status in the system as Paid Off.

Where the repayment selection is to renew the loan or to renew with a partial down payment, the system can place the customer into the ACH Queue. Once an ACH debit transaction is generated to make a repayment on the loan, the system will electronically mark the loan that is marked for renewal with a status of Pending Renewal Loan or Pending Renewal Loan R. This status will be assigned to the loan during a predetermined number of days during which the lender waits to receive a negative response concerning the successful completion of the transaction. Depending on other types of payments accepted by the lender (e.g., check, money order, credit card, or cash), the system can also hold, i.e., maintain, the status of the loan unchanged that is marked for extension with a predetermined number of hold days assigned to each payment type. When an ACH debit transaction is generated for a first loan or a renewal loan, the status of the loan is changed to Pending Paid Off or Renewal Loan Pending Paid Off If a negative response is not received from the ACH transaction processor (which, if received, would indicate that the ACH transfer payment of the customer's first loan was not successful, then that first loan can be marked with a status as Paid Off Loan or Paid Off Loan R. If the loan was not a first loan but was a previously renewed loan, then the repaid renewed loan can be marked with a status as Renewed Loan Paid Off or Renewed Loan R Paid Off. If a negative response is received from the ACH transaction processor that the attempted ACH transaction for repayment of the customer's first loan is unsuccessful, then the first loan can be marked with a status as Returned Item or Returned Item R; however, if the customer's loan was a previously renewed loan, then the renewed loan, for which repayment failed, will be marked with a status as Returned Item or Returned Item R. In the event that the lender receives a negative response of "unsuccessful" for a renewal loan when ACH repayment is attempted, then the customer can lose his or her privilege for renewals and the lender (e.g., a pay day loan company) can start collection efforts on the initial loan.

This feature of the system is known as the bounce-bounce process. When an ACH repayment transaction is initiated to debit money from a customer's account (e.g., bank account or credit card account), if a sufficient amount of funds are not present in the account to cover the loan payment as requested in the ACH transaction, then the finance fee that is owed as part of the scheduled repayment is sent to collections while the original principal loan amount is set up as a new loan in the system rather than being sent to collections. For example, if the lender makes a loan to a customer in the amount of $100 loan at 30% interest, and the ACH transfer fails for a first time for lack of sufficient funds to cover the scheduled payment, then the first nonpayment results in a $30 finance fee that is sent to collections and the original $100 loan principal is set up as a new loan. This first nonpayment is known as the first return. If a second consecutive return occurs, the entire amount of the loan can be placed in collections. The system automatically tracks which customers have paid and failed to pay first returns and second returns as well as the number of loans that have stayed current and how many went bad after first returns and second consecutive returns.

If the selected due date option was to repay the loan in full, the system can place the customer into the ACH Queue. Once the ACH debit transaction for repayment is generated, the system can mark the loan with a status as Pending Paid Off or Pending Paid Off R. This status will be assigned to the loan during a predetermined number of days during which the lender waits to make certain that a negative response is not received from the ACH transaction processor concerning the completion of the transaction. Depending on other types of payments accepted by the lender (e.g., check, money order, credit card, or cash), the system can also hold, i.e., maintain, the status of the loan unchanged that is marked for extension with a predetermined number of hold days assigned to each payment type.

As with due date options for repayment as a renewal loan or a renewal with partial down payment, if the response confirming repayment in full of the customer's first loan is successful then that first loan, which is not renewed, can be marked with a status as Paid Off Loan or Paid Off Loan R. If the loan was not a first loan but was a previously renewed loan, then the repaid renewed loan can be marked with a status as Renewed Loan Paid Off or Renewed Loan R Paid Off. If a negative response is received by the system from the ACH transaction processor confirming that repayment of the customer's first loan is unsuccessful, then the first loan can be marked with a status as Returned Item or Returned Item R. If the customer's loan was a previously renewed loan, then the renewed loan, for which repayment failed, will be marked with a status as Returned Item or Returned Item R. In the event that the repayment attempt by the customer receives a negative response from the ACH transaction processor of "unsuccessful" for a renewal loan, then the customer can lose his or her privilege for renewals and the lender (e.g., a pay day loan company) can start collection efforts on the initial loan.

The loan repayment plan governed by the system can be programmed to allow installment repayments. Generally, if the customer's repayment plan was originated for the Pending Paid Off status, this status is active while installments are being paid by the customer. In other words, some installment repayments may be paid and processed during a loan's Pending Paid Off status.

After renewal of a loan, if no additional extensions for repayment remain, or if the repayment in full option is selected in the due date options, then the system will place the account into the ACH Queue for repayment of the full balance due and after a debit transaction is generated it will change account status to Renewed Loan Pending Paid Off or Renewed Loan Pending Paid Off R. If the response confirming repayment of the customer's first loan is successful then that first loan can be marked with a status as Paid Off Loan or Paid Off Loan R. These two statuses indicate an end account condition of the loan. If the loan was not a first loan but was a previously renewed loan, then the repaid renewed loan can be marked with a status as Renewed Loan Paid Off or Renewed Loan R Paid Off. If the response confirming repayment of the customer's first loan is unsuccessful, then the first loan can be marked with a status as Returned Item or Returned Item R. If the customer's loan was a previously renewed loan, then the renewed loan, for which repayment failed, will be marked with a status as Returned Item or Returned Item R. In the event that the repayment attempt by the customer receives a response of "unsuccessful" for a renewal loan, then the customer can lose his or her privilege for renewals and the lender (e.g., a pay day loan company) can start collection efforts on the initial loan.

When a loan is in the extension process and the ACH transaction for repayment has been generated, the first loan is assigned a status of Pending Renewal Loan or Pending Renewal Loan R while the second loan is assigned a status Pending Application or Pending Application R.

On the due date for repayment, the ACH transaction for repayment is generated and the loan's account status is marked as Pending Paid Off or Pending Paid Off R. If the response for the loan that is marked as Pending Paid Off or Pending Paid Off R loan is unsuccessful, the status of the loan will be marked as Returned Item or Returned Item R.

If the customer was referred to collections for a predetermined number of days from the last due date, then the status assigned, e.g., automatically by the system, to the loan can be Charged Off or Charged Off R.

When arrangement for repayment is made on the customer's account that is in collections, in one embodiment, an ACH transaction can be generated, and the system can assign the following status to the customer account: Returned Item Pending Paid Off or Returned Item Pending Paid Off R. In other embodiments, other type of repayment may be utilized. This status will be assigned to the loan during a predetermined number of days during which the lender waits to determine whether a negative response concerning the successful completion of the transaction will be received by the system from the ACH transaction processor. Depending on other types of payments accepted by the lender (e.g., check, money order, credit card, or cash), the system can also hold, i.e., maintain, the status of the loan unchanged that is marked for extension with a predetermined number of hold days assigned to each payment type. During this status, the customer should be removed from the In Collections Queue. The system can track and process collections-related ACH transactions separately from regular ACH repayment transactions arranged with the customer.

If the response confirming receipt of successful repayment by the generated ACH transaction or other type of payment is unsuccessful, the system can assign a status of Returned Item or Returned Item R. In this case, the customer can be placed again in the In Collections Queue.

If the customer was in collections for a predetermined number of days from the last Due Date (as programmed into the system), the loan held by the customer can assigned a status of Charged Off or Charged Off R. The system can be programmed to automatically assign such a status. If the response confirming repayment by the generated ACH transaction or other type of payment is successful, the system can assign a status of Returned Item Paid Off or Returned Item Paid Off R to the customer's account. If the response confirming receipt of repayment for the generated ACH transaction or other type of payment is unsuccessful and the customer was in the Charged Off or Charged Off R status, the system can assign a status of Charged Off or Charged Off R to the customer's account, which will be returned back to the In Collections Queue.

When the customer makes a repayment arrangement for a last installment for a loan, when the ACH transaction is generated, the system can change the status to Charged Off Pending Paid Off or Charged Off Pending Paid Off R. If the response for the generated ACH transaction or other type of payment is successful, the system can assign a status of Charged Off Paid Off or Charged Off Paid Off R to the customer's account.

When the lender approaches the customer and settles the account and when an ACH transaction or other type of payment is generated, the system can change the status to Settlement Pending Paid Off or Settlement Pending Paid Off R.

If the response confirming the success of a repayment for the loan that is marked as Renewed Loan Pending Paid Off or Renewed Loan Pending Paid Off R is unsuccessful, it will be marked as Returned Item or Returned Item R and is returned to the Collections Queue.

If the response for the loan that is marked as Renewed Loan Pending Paid Off or Renewed Loan Pending Paid Off R is successful, it will be marked as Renewed Loan Paid Off or Renewed Loan R Paid Off.

If the response for the loan that is marked as Settlement Pending Paid Off or Settlement Pending Paid Off R is unsuccessful, it will be marked with a status as Returned Item or Returned Item R and is returned to the In Collections Queue.

When the last installment for the loan that was settled is paid off successfully, the system will change the status to Settlement Paid Off or Settlement Paid Off R.

When a negative response is received by the system from the ACH transaction processor that the payment of the extension loan is unsuccessful, the system can void the extension loan and assign the status for the extension loan as Voided Renewed Loan or Voided Renewed Loan R. In the event that a negative, or unsuccessful, response is received by the system from the ACH transaction processor with respect to repayment of the renewal loan, the customer loses his or her privilege for renewals and the lender may start collection efforts on the initial loan unless the lender has enabled the bounce-bounce feature with respect to the customer's loan.

If the response for the first loan that is getting renewed is successful, then the system will mark the loan with a status as Paid Off Loan or Paid Off Loan R; however, if the loan was a previously renewed loan, it will be marked in the system with a status as Renewed Loan Paid Off or Renewed Loan R Paid Off.

The system's user can initiate a status for the loan as Returned Item or Returned Items R by marking posted payment as returned (check payment, money order).

If the response for the transaction in the installment for the settled loan is unsuccessful, then the system can change the status to Charged Off or Charged Off R, and the customer will again be placed in the In Collections Queue.

When the customer in collections makes repayment arrangements to settle the loan amount and an ACH transaction or other type of payment is posted to the account, the system can change the status of the loan to Settlement Pending Paid Off or Settlement Pending Paid Off R, and the customer should be removed from the Collections Queue.

The system also includes features that will allow up to two simultaneous (or consecutive) loans to be opened when a return transaction occurs during the renewal process.

A parent loan can be placed into collections (e.g., as Returned Item status) in the amount of the debit transaction that was returned. If the Renew Option was selected on the system's due date options module then only the finance fee amount will be placed into collections, and the loan principal will be renewed as a renewal loan. If the renewal with partial down payment option of the due date options module was selected, then the amount placed into collections for recovery can be determined in the following manner: (i) if one debit transaction was selected in default due date options module, then the full amount of returned transaction, which includes the finance fee and any principal pay-down, is placed into collections; and (ii) if two debit transactions were selected in default due date options module, then only the amount of the returned transactions is sent to collections.

A child loan will not be voided and will receive Renewed Loan status. Any remaining balance of the parent loan principal will constitute the principal of the child loan and finance fee will be taken from a fee matrix.

If the renewed loan (i.e., child loan) receives the returned transaction during its renewal then the entire loan amount (i.e., principal plus finance fees) will be placed into collections and the child loan will be voided.

These features related to consecutive loans work only one time for two consecutive related loans until the second Return is received. If the features for opening consecutive loans work one time for two consecutive loans, e.g., if the features was utilized for a parent loan, then a child loan of the parent loan cannot use the feature; however, if the feature was utilized one time for a grandparent loan, then the feature may be used with a current loan as well.

Using the system, the customer may also elect and has the ability to make repayments before he or she promised to make the repayment, before the due date, or before a scheduled payment date.

If the customer has a regular payment plan or no payment plan at all, loan status can be changed to Return Item only if the last installment (which is to be made on the loan's due date) has already been returned. If any other payments are returned before the due date, the payment plan can be recalculated for a lesser number of installments. For example, the new number of installments may equal the previously scheduled number of installments minus one installment)

When a customer makes an unexpected payment (that is, a payment not according to the payment plan) the payment plan can be recalculated. A Return for an unexpected payment has no effect if it was received before the loan's due date, i.e., the payment plan and status of the loan are not changed.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A loan management system comprising:
a server comprising at least one database stored thereon;
a computer that is located remotely from the server;
a telecommunications network that communicatively connects the server and the computer;
loan management software installed on at least one of the server and the computer, wherein the loan management software comprises modules, wherein the modules are operated to process a new loan application, the modules comprising:
  (i) an automated loan and lead management platform configured to accept the new loan application and automatically determine the new loan application to be classified as having a status of either accepted or denied, wherein the new loan application that is classified as accepted is prepared for funding, and wherein the new loan application that is classified as denied is resold as a lead;
  (ii) an automated store-level lead platform configured to accept a new loan application on a computer located at a retail location, automatically determine to classify the new loan application as having a status of either accepted or denied at the retail location using the loan management software installed on the computer, automatically and electronically prepare the new loan application classified as accepted for funding, and automatically and electronically transmit the new loan application classified as denied to a client as a lead generated by the store-level lead platform;
  (iii) an automated underwriting module installed on the server comprising a plurality of underwriting rules used in automatically and electronically determining rules for classifying the new loan application as having a status of either accepted or denied, wherein a system administrator can select one or more of the plurality of underwriting rules to implement based on cost criteria;
  (iv) an automated collections tracking module installed on the server to analyze the new loan application, wherein when the new loan application is classified as denied, the collections tracking module transmits the lead to a lender client, wherein the lead comprises information related to a loan applicant whose new loan application is classified as denied, wherein the lead is compared electronically against a plurality of collection records stored in the at least one database stored on the server to determine whether the loan applicant matches one of the plurality of collection records containing information related to a defaulted borrower, and wherein the collections tracking module automatically and electronically notifies the lender client when a loan applicant-defaulted borrower match is located; and
  (v) an automated lead generation module installed on the server and accessible to a loan applicant via the computer to analyze the new loan application, wherein the lead generation module is integrated with the loan application system, wherein the lead generation module performs minimal processing on the new loan application that is classified as accepted, and wherein the lead generation module comprises lead generation features that are activated electronically if a first loan application submitted by the loan applicant is classified as denied by the loan management system or withdrawn by the loan applicant so that the loan applicant is electronically directed by the loan management system to the lead generation module comprising a website through which the loan applicant can input user information to automatically and electronically submit a second loan application, and wherein the transmission of the second loan application to the server generates the lead for resale to other lenders.

2. The loan management system of claim 1, wherein the system further comprises:
wherein the loan management software comprises a client component installed on the computer and an administrator component installed on the server, wherein the loan management software comprises machine-readable instructions and data for causing the computer to set up bi-directional communications with the server, wherein such bi-directional communications are established by requests initiated by the computer, wherein the bi-directional communications comprise new loan application submission, new loan application processing to classify the new loan application as having a status of either accepted or denied, collections tracking to analyze the new loan application classified as denied to facilitate renewed collection efforts on detected prior defaulted debts, and lead generation comprising leads created from the new loan applications that are withdrawn and classified as denied, wherein the new loan application is for a short-term loan.

3. The loan management system of claim 2, wherein the system further comprises an intelligent lead routing module that (i) analyzes demographic and financial attributes of a customer and determines the types of loan products and underwriting channels that are needed for the customer and (ii) predicts potential profitability of the lead indicative of a lifetime value of the customer associated with the lead so that a lead recipient knows how much can be paid for the lead considering factors that include a fee while still making a profit.

4. The loan management system of claim 2, wherein the system further comprises a marketing module for creating a marketing campaign based on a customer's attributes.

5. The loan management system of claim 4, wherein the marketing campaign is triggered based on an event that occurs.

6. The loan management system of claim 4, wherein the marketing campaign is triggered based on an event that the system recognizes does not occur.

7. The loan management system of claim 2, wherein the computer is located in a home or office of a customer.

8. The loan management system of claim 2, wherein the computer is located in a retail location.

9. The loan management system of claim 2, wherein the system receives a new loan application submission and either accepts or rejects the loan application based upon customer attributes.

10. The loan management system of claim 9, wherein the system generates a lead created from a rejected loan application and sells the lead to a lead recipient.

11. The loan management system of claim 2, wherein the system comprises a bounce-bounce process software module that automatically sends a finance fee due on a loan that is in repayment to collections if a first loan payment is not made and converts the original principal of the loan into a new loan.

12. The loan management system of claim 11, wherein, if a second loan payment is not paid, which is due consecutively after the first loan payment, then the finance fee due on the loan in connection with the second loan payment as well as the new loan created after the first failed payment are both sent to collections.

13. The loan management system of claim 12, wherein the system automatically suspends borrowing privileges of a customer who fails to make two consecutive loan payments.

14. The loan management system of claim 2, wherein the system automatically voids a customer's e-signature on a loan application if a loan approved a result of the loan application is not set for funding by an established effective date, and wherein the system generates and sends the customer an e-mail request to resign the loan application to establish a new effective date.

15. The loan management system of claim 2, wherein the system comprises an automated loan portfolio analysis feature for analyzing customer attributes and profitability on a dynamic real-time basis.

16. The loan management system of claim 15, wherein the automated loan portfolio analysis feature permits a user to dynamically analyze and compare the business impact of a plurality of underwriting processes on one or more customers or customer segments with respect to at least one business criteria.

17. The loan management system of claim 16, wherein the at least one business criteria comprises one or more of origination volume, delinquency, first payment default, renewal rates, and profitability.

18. The loan management system of claim 15, wherein the system's automated loan portfolio analysis feature sorts data by one or more lead attributes.

19. The loan management system of claim 18, wherein the one or more lead attributes comprise a source of a lead, a store in which the lead was processed, a type of loan, one or more customer attributes, a date range, and a time range.

20. The loan management system of claim 1, wherein the new loan application is for a short-term loan.

* * * * *